(12) United States Patent
Bar-Haim et al.

(10) Patent No.: US 10,545,419 B2
(45) Date of Patent: Jan. 28, 2020

(54) ELECTROSTATIC INK COMPOSITIONS

(71) Applicant: HP Indigo B.V., Amstelveen (NL)

(72) Inventors: Gil Bar-Haim, Holon (IL); Tal Rosenthal, Nes Ziona (IL); Albert Teishev, Rishon le-Zion (IL); Marc Klein, Tel-Aviv (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/565,640

(22) PCT Filed: Jul. 17, 2015

(86) PCT No.: PCT/EP2015/066470
§ 371 (c)(1),
(2) Date: Oct. 10, 2017

(87) PCT Pub. No.: WO2017/012643
PCT Pub. Date: Jan. 26, 2017

(65) Prior Publication Data
US 2018/0074424 A1 Mar. 15, 2018

(51) Int. Cl.
| | |
|---|---|
| G03G 9/13 | (2006.01) |
| G03G 9/08 | (2006.01) |
| C09D 11/52 | (2014.01) |
| C09D 11/10 | (2014.01) |
| C09D 11/106 | (2014.01) |
| G03G 9/135 | (2006.01) |
| C09D 11/03 | (2014.01) |
| C09D 11/037 | (2014.01) |
| C09D 11/107 | (2014.01) |
| G03G 9/12 | (2006.01) |

(52) U.S. Cl.
CPC .......... *G03G 9/0812* (2013.01); *C09D 11/03* (2013.01); *C09D 11/037* (2013.01); *C09D 11/10* (2013.01); *C09D 11/106* (2013.01); *C09D 11/107* (2013.01); *C09D 11/52* (2013.01); *G03G 9/0804* (2013.01); *G03G 9/12* (2013.01); *G03G 9/122* (2013.01); *G03G 9/131* (2013.01); *G03G 9/135* (2013.01)

(58) Field of Classification Search
CPC .......... G03G 9/122; G03G 9/131; G03G 9/12; G03G 9/135; G03G 9/0812; G03G 9/0804
USPC ........................ 430/114, 115, 112, 137, 22
See application file for complete search history.

(56) References Cited

U.S. PATENT DOCUMENTS

| | | | | |
|---|---|---|---|---|
| 4,702,984 A * | 10/1987 | El-Sayed | ............... | G03G 9/131 430/115 |
| 5,308,731 A | 5/1994 | Larson et al. | | |
| 5,521,046 A * | 5/1996 | Materazzi | ................ | G03G 9/12 430/115 |
| 7,604,915 B2 | 10/2009 | Chung et al. | | |
| 7,794,910 B2 * | 9/2010 | Ron | ..................... | G03G 9/1355 430/115 |
| 2002/0165102 A1 * | 11/2002 | Hata | .................... | C10M 133/56 508/192 |
| 2007/0293405 A1 * | 12/2007 | Zhang | ................... | B82Y 30/00 508/113 |
| 2010/0136474 A1 * | 6/2010 | Iwase | ..................... | G03G 9/122 430/115 |
| 2012/0004345 A1 * | 1/2012 | Chun | ................... | C08K 5/0041 523/207 |
| 2012/0107579 A1 * | 5/2012 | Grinwald | ............. | C09D 11/326 428/195.1 |
| 2013/0016420 A1 | 1/2013 | Yeo et al. | | |
| 2014/0030651 A1 * | 1/2014 | Stolin Roditi | ......... | C09D 11/02 430/114 |
| 2014/0162186 A1 * | 6/2014 | Ganapathiappan | ...... | G03G 9/16 430/137.14 |
| 2014/0186764 A1 | 7/2014 | Yamada et al. | | |
| 2014/0295338 A1 | 10/2014 | Keoshkerian et al. | | |
| 2015/0064424 A1 | 3/2015 | Negreanu et al. | | |
| 2017/0010555 A1 * | 1/2017 | Iwase | ..................... | G03G 9/125 |

FOREIGN PATENT DOCUMENTS

| | | | | |
|---|---|---|---|---|
| JP | 2011-128388 | * | 6/2011 | |
| JP | 2011128388 | | 6/2011 | |
| WO | WO 2007/130069 | | 11/2007 | |
| WO | WO-2007/130069 A1 * | | 11/2007 | |
| WO | WO 2009/158501 | | 12/2009 | |
| WO | WO 2011/046562 | | 4/2011 | |
| WO | WO 2013/107498 | | 7/2013 | |
| WO | WO-2013178265 A1 * | | 12/2013 | ........... C09D 11/037 |
| WO | WO 2014/012597 | | 1/2014 | |
| WO | WO-2014/012597 A1 * | | 1/2014 | |

OTHER PUBLICATIONS

Espacenet English-language abstract describing Japanese Patent document JP2011-128388 A (pub. Jun. 2011).*
Grant, R. et al., ed., Grant & Hackh's Chemical Dictionary, fifth edition, McGraw-Hill Book Company, NY (1987), p. 268.*
Whelan, T., ed., Polymer Technology Dictionary, Chapman & Hall, London (1994), p. 256.*
Espacenet machine-assisted English-language translation of JP 2011-128388 (pub. Jun. 2011).*
International Search Report and Written Opinion for International Application No. PCT/EP2015/066470 dated Sep. 30, 2015, 11 pages.

(Continued)

*Primary Examiner* — Janis L Dote
(74) *Attorney, Agent, or Firm* — Dierker & Kavanaugh PC (57) ABSTRACT

Herein is disclosed magenta liquid electrostatic ink compositions. In some examples, the electrostatic ink compositions comprise a magenta pigment, a basic dispersant, a resin comprising a polymer having acidic side groups, a carrier liquid and a charge director, wherein the dispersant comprises a compound comprising a succinimide group linked to a primary, secondary or tertiary amine.

15 Claims, 1 Drawing Sheet

(56) References Cited

OTHER PUBLICATIONS

"Permanent Carmine FBB 02", Product Data Sheet—Printing Inks, Clariant, 2009, 2pgs.

Pigment Red 146, Webpage from Chemical Book: Chemical Book CAS Database List; CAS No. 5280-68-2, 2 pages, 2010.

"Dispersing Process," Webpage from http://www.inkline.gr.inkjet/newtech/tech/dispersion/, Published by: Inkline.gr, 14 pages, Retrieved May 21, 2015.

Pigment Red 122, Webpage from http://www.dyestuffintermediates.com/pigment-dye/pigment-red-122.html, 6 pages, Published by Dyestuffintermediates.com, Retrieved Jun. 16, 2015.

Pigment Red 168, Webpage from http://www.dyestuffintermediates.com/pigment-dye/pigment-red-168.html, 6 pages, Published by Dyestuffintermdiates.com, Retrieved Jun. 19, 2015.

"EFKA® 4340 Your value improver for high performance pigments" Technical Bulletin, 5 pages, Published by EKFA Additives BV, NL, Apr. 2005.

* cited by examiner

ELECTROSTATIC INK COMPOSITIONS

BACKGROUND

Electrophotographic printing processes, sometimes termed electrostatic printing processes, typically involve creating an image on a photoconductive surface, applying an ink having charged particles to the photoconductive surface, such that they selectively bind to the image, and then transferring the charged particles in the form of the image to a print substrate.

The photoconductive surface may be on a cylinder and is often termed a photo imaging plate (PIP). The photoconductive surface is selectively charged with a latent electrostatic image having image and background areas with different potentials. For example, an electrostatic ink composition including charged toner particles in a liquid carrier can be brought into contact with the selectively charged photoconductive surface. The charged toner particles adhere to the image areas of the latent image while the background areas remain clean. The image is then transferred to a print substrate (e.g. paper) directly or, by being first transferred to an intermediate transfer member, which can be a soft swelling blanket, which is often heated to fuse the solid image and evaporate the liquid carrier, and then to the print substrate.

DETAILED DESCRIPTION

Figure 1:
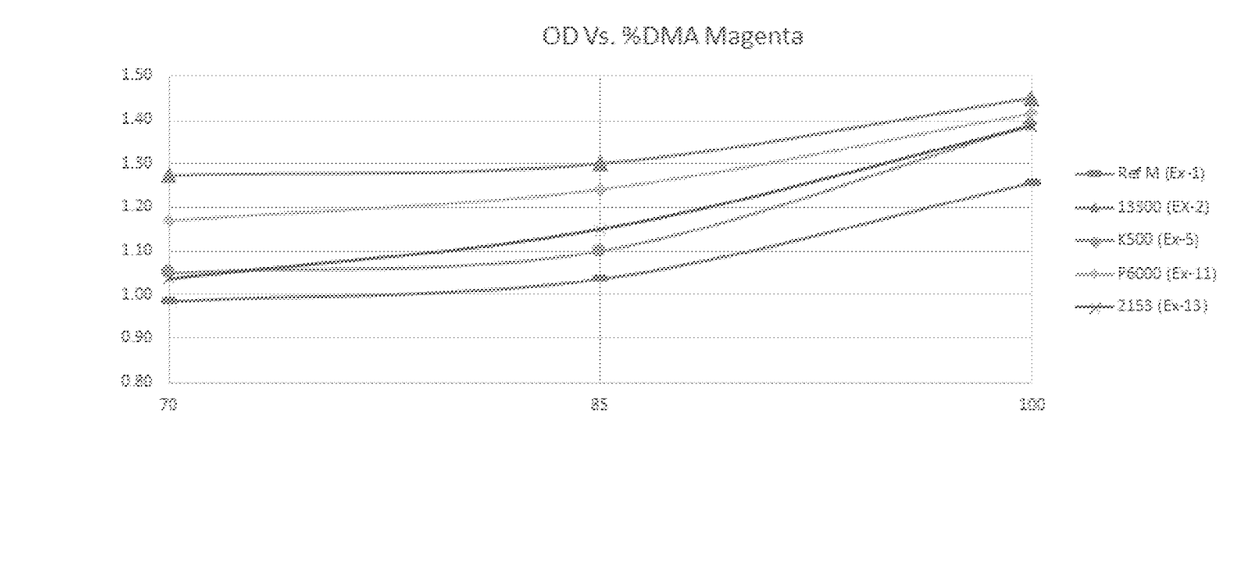
The FIGURE illustrates results from a test described in the Examples below on an example of an ink according to the present disclosure and other inks. The graph shows optical density (y axis) vs DMA (x axis).

Before the methods, compositions, print substrates and related aspects of the disclosure are disclosed and described, it is to be understood that this disclosure is not limited to the particular process steps and materials disclosed herein because such process steps and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a," "an," and "the" include plural referents unless the context clearly dictates otherwise.

As used herein, "liquid carrier", "liquid carrier," "carrier," or "carrier vehicle" refers to the fluid in which the polymer resin, pigment, charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to an ink composition, which may be in liquid form, that is typically suitable for use in an electrostatic printing process, sometimes termed an electrophotographic printing process. The electrostatic ink composition may include chargeable particles of the resin and the pigment dispersed in a liquid carrier, which may be as described herein.

As used herein, "co-polymer" refers to a polymer that is polymerized from at least two monomers.

A certain monomer may be described herein as constituting a certain weight percentage of a polymer. This indicates that the repeating units formed from the said monomer in the polymer constitute said weight percentage of the polymer.

If a standard test is mentioned herein, unless otherwise stated, the version of the test to be referred to is the most recent at the time of filing this patent application.

As used herein, "electrostatic(ally) printing" or "electrophotographic(ally) printing" generally refers to the process that provides an image that is transferred from a photo imaging substrate or plate either directly or indirectly via an intermediate transfer member to a print substrate, e.g. a paper substrate. As such, the image is not substantially absorbed into the photo imaging substrate or plate on which it is applied. Additionally, "electrophotographic printers" or "electrostatic printers" generally refer to those printers capable of performing electrophotographic printing or electrostatic printing, as described above. "Liquid electrophotographic printing" is a specific type of electrophotographic printing where a liquid ink is employed in the electrophotographic process rather than a powder toner. An electrostatic printing process may involve subjecting the electrophotographic ink composition to an electric field, e.g. an electric field having a field strength of 1000 V/cm or more, in some examples 1000 V/mm or more.

As used herein, the term "about" is used to provide flexibility to a numerical range endpoint by providing that a given value may be a little above or a little below the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

Unless otherwise stated, any feature described herein can be combined with any aspect or any other feature described herein.

In an aspect, there is provided a magenta liquid electrostatic ink composition. The magenta liquid electrostatic ink composition comprises, in some examples a magenta pigment, a basic dispersant, a resin comprising a polymer having acidic side groups, a carrier liquid and a charge director, wherein the dispersant comprises a compound comprising a succinimide group linked to a primary, secondary or tertiary amine.

In an aspect, there is provided a method of producing a magenta liquid electrostatic ink composition. The method comprises, in some examples:

combining a magenta pigment, a basic dispersant and a resin comprising a polymer having acidic side groups, a carrier liquid, and a charge director to form the liquid electrostatic ink composition wherein the dispersant comprises a compound comprising a succinimide group linked to a primary, secondary or tertiary amine.

Method of Producing an Electrostatic Ink Composition

In some examples, the method of forming an electrostatic ink composition includes:

mixing a magenta pigment, a liquid carrier (which may be termed a first liquid carrier herein), and a dispersant to form a pigment dispersion; and then grinding the pigment dispersion with a resin comprising a polymer having acidic side groups, and wherein a charge director is combined with the magenta pigment and dispersant before, during or after the grinding of the pigment dispersion with the resin to form the electrostatic ink composition wherein the dispersant comprises a compound comprising a succinimide group linked to a primary, secondary or tertiary amine.

In some examples, the method of forming an electrostatic ink composition includes:

mixing a magenta pigment, a first liquid carrier, and a dispersant to form a pigment dispersion; and then adding a resin comprising a polymer having acidic side groups and grinding the pigment dispersion with the resin, and wherein a charge director is combined with the magenta pigment and dispersant before, during or after the grinding of the pigment dispersion with the resin to form the electrostatic ink composition, wherein the dispersant comprises a compound comprising a succinimide group linked to a primary, secondary or tertiary amine. In some examples, during the mixing of the magenta pigment, the dispersant and the first liquid carrier, a resin is absent; in other words, in some examples, the pigment dispersion formed from the mixing of the pigment, the dispersant and first liquid carrier may lack a resin.

In some examples, the method of forming an electrostatic ink composition includes:

grinding a magenta pigment, a first liquid carrier, and a dispersant to form a pigment dispersion; and then grinding the pigment dispersion with a resin comprising a polymer having acidic side groups, and wherein a charge director is combined with the magenta pigment and dispersant before, during or after the grinding of the pigment dispersion with the resin to form the electrostatic ink composition wherein the dispersant comprises a compound comprising a succinimide group linked to a primary, secondary or tertiary amine.

In some examples, the method of forming an electrostatic ink composition includes:

grinding a magenta pigment, a first liquid carrier, and a dispersant to form a pigment dispersion; and then adding a resin comprising a polymer having acidic side groups and grinding the pigment dispersion with the resin, and wherein a charge director is combined with the magenta pigment and dispersant before, during or after the grinding of the pigment dispersion with the resin to form the electrostatic ink composition, wherein the dispersant comprises a compound comprising a succinimide group linked to a primary, secondary or tertiary amine. In some examples, during the grinding of the magenta pigment, the first liquid carrier and the dispersant to form the pigment dispersion, a resin is absent; in other words, in some examples, the pigment dispersion formed from the grinding of the pigment, the first liquid carrier and the dispersant may lack a resin.

In some examples, the method of forming an electrostatic ink composition includes:

mixing a magenta pigment, a first liquid carrier, and a dispersant to form a pigment dispersion; and then grinding the pigment dispersion with a resin comprising a polymer having acidic side groups and second liquid carrier, and wherein a charge director is combined with the magenta pigment and dispersant before, during or after the grinding of the pigment dispersion with the resin to form the electrostatic ink composition, wherein the dispersant comprises a compound comprising a succinimide group linked to a primary, secondary or tertiary amine.

In some examples, the method of forming an electrostatic ink composition includes:

mixing a magenta pigment, a first liquid carrier, and a dispersant to form a pigment dispersion; and then adding a resin comprising a polymer having acidic side groups to the pigment dispersion and grinding the pigment dispersion with the resin and second liquid carrier, and wherein a charge director is combined with the magenta pigment and dispersant before, during or after the grinding of the pigment dispersion with the resin to form the electrostatic ink composition, wherein the dispersant comprises a compound comprising a succinimide group linked to a primary, secondary or tertiary amine. In some examples, during the mixing of the magenta pigment, the dispersant and the first liquid carrier, a resin is absent; in other words, in some examples, the pigment dispersion formed from the mixing of the magenta pigment, the dispersant and first liquid carrier may lack a resin.

In the above examples, the first liquid carrier and the second liquid carrier can be the same or different liquid carriers, and may be as described below. In some examples, the second liquid carrier is added to the pigment dispersion after the pigment dispersion is formed, and then the pigment dispersion, the resin and the second liquid carrier are ground together, wherein the dispersant comprises a compound comprising a succinimide group linked to a primary, secondary or tertiary amine. The second liquid carrier can be a further volume of the first liquid carrier. In some examples, the pigment dispersion may lack the second liquid carrier.

In the above examples, the charge director is combined with the magenta pigment and dispersant before, during or after the grinding of the pigment dispersion with the resin to form the electrostatic ink composition, in some examples the charge director is combined with the magenta pigment and dispersant after the grinding of the pigment dispersion with the resin, and, if present, the first liquid carrier, to form the electrostatic ink composition.

In the above examples, mixing components together may involve grinding components together. In some examples, the grinding of either or both steps (i.e. mixing the magenta pigment and the dispersant to form the pigment dispersion or grinding the pigment dispersion with the resin) takes place in a ball mill, e.g. an agitated small media mill. In some examples, the grinding of either or both steps takes place in a ball mill for at least 15 minutes, in some examples at least 30 minutes, in some examples 30 minutes to 15 hours, in some examples 30 minutes to 10 hours, in some examples 30 minutes to 10 hours, in some examples 30 minutes to 5 hours, and/or in some examples the ball mill rotates at an rpm of at least 100 rpm, in some examples an rpm of at least 500 rpm, in some examples an rpm of 100 rpm to 6000 rpm, in some examples an rpm of 1000 rpm to 6000 rpm. The balls used in a ball mill may be, for example, metal, e.g. steel, balls or ceramic balls, and/or may have a diameter of 0.1 mm to 3 mm, in some examples 0.3 mm to 2 mm, in some examples 0.3 mm to 1 mm. The magenta pigment may be a particulate magenta pigment. If the magenta pigment is a particulate magenta pigment, grinding of the magenta pigment may indicate that at least some of the particles of the magenta pigment are reduced in size. Grinding of the pigment dispersion may involve reduction in size of at least some of the particles in the pigment dispersion, which may comprise the pigment and the resin.

Pigment

The electrostatic ink composition includes a magenta pigment. The magenta pigment may be a pigment selected from an azo compound, a quinacridone, an anthraquinone, an anthanthrone, a diketopyrrolopyrrole, a perelylene, a perinone, a phthalein, a xanthene, a pyranthrone, a thioindigoid, a pyrazoloquinazolone, a heterocyclic compound, and a benzimidazolone.

The magenta pigment may be selected from Pigment Red 2, Pigment Red 3, Pigment Red 5, Pigment Red 8, Pigment Red 12, Pigment Red 21, Pigment Red 22, Pigment Red 23, Pigment Red 31, Pigment Red 38, Pigment Red 48:1, Pigment Red 48:2, Pigment Red 48:3, Pigment Red 48:45 Pigment Red 49:1, Pigment Red 49:2, Pigment Red 53:1, Pigment Red 57:1, Pigment Red 81, Pigment Red 88, Pigment Red 112, Pigment Red 122, Pigment Red 123, Pigment Red 144, Pigment Red 146, Pigment Red 149, Pigment Red 168, Pigment Red 170, Pigment Red 174, Pigment Red 175, Pigment Red 176, Pigment Red 177, Pigment Red 179, Pigment Red 185, Pigment Red 190, Pigment Red 194, Pigment Red 202, Pigment Red 208, Pigment Red 224, Pigment Red 251, Pigment Red 254, Pigment Red 257, Pigment Red 272, Pigment Violet 19, Pigment Violet 23, and any combination thereof.

In some examples, the magenta pigment may be or comprise a naphthol pigment. A naphthol pigment is a pigment derived from and/or containing a naphthol group. In some examples, the magenta pigment may be selected from Pigment Red 2, Pigment Red 3, Pigment Red 5, Pigment Red 7, Pigment Red 8, Pigment Red 9, Pigment Red 17, Pigment Red 22, Pigment Red 112, Pigment Red 150, Pigment Red 23, Pigment Red 146, Pigment Red 170, Pigment Violet 13, Pigment Violet 25, Pigment Violet 44.

The pigment may constitute at least 0.1 wt % of the solids of the electrostatic ink composition, in some examples at least 0.2 wt % of the solids of the electrostatic ink composition, in some examples at least 0.3 wt % of the solids of the electrostatic ink composition, in some examples at least 0.5 wt % of the solids of the electrostatic ink composition, in some examples at least 1 wt % of the solids of the electrostatic ink composition. In some examples the pigment may constitute from 1 wt % to 50 wt % of the solids of the electrostatic ink composition, in some example from 5 wt % to 40 wt % of the solids of the electrostatic ink composition, in some examples from 20 wt % to 40 wt % of the solids of the electrostatic ink composition, in some examples 25 wt % to 35 wt % of the solids of the electrostatic ink composition, in some examples 5 wt % to 20 wt % of the solids of the electrostatic ink composition.

The inventors have discovered that pre-mixing, e.g. by grinding, the pigment with a basic dispersant as defined herein allows the use of less pigment in the electrostatic ink composition to achieve the same optical density. Therefore, in some examples, the pigment may constitute from 5 wt % to 30 wt % of the solids of the electrostatic ink composition, in some examples from 10 wt % to 25 wt % of the electrostatic ink composition, in some examples from 15 wt % to 25 wt % of the electrostatic ink composition, in some examples from 12 wt % to 22 wt % of the electrostatic ink composition, in some examples less than 25 wt % of the electrostatic ink composition, in some examples less than 22 wt % of the electrostatic ink composition, in some examples less than 20 wt % of the electrostatic ink composition.

The pigments can be any pigment compatible with the liquid carrier and useful for electrostatic printing. For example, the pigment may be present as pigment particles, or may include a resin (in addition to the polymers described herein) and a pigment. The resins and pigments can be any of those commonly used as known in the art. For example, pigments by Hoechst including HOSTAPERM® SCARLET GO, Permanent Rubine F6B; pigments by Sun Chemical including, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including; pigments by Mobay including QUINDO® MAGENTA, INDOFAST® BRILLIANT SCARLET, QUINDO® RED 6700, QUINDO® RED 6713, INDOFAST® VIOLET.

Dispersant

The method involves using and/or the electrostatic ink composition includes a dispersant, which is basic, and in some examples the dispersant is or comprises a polymeric dispersant or a surfactant. In some examples, the dispersant is or comprises an electrostatic dispersant or a steric dispersant, or both an electrostatic and a steric dispersant. In some examples, the dispersant comprises a compound comprising a succinimide group linked to a primary, secondary or tertiary amine.

A polymeric dispersant is a polymeric material having an anchor group capable of being absorbed on to the surface of a particle in a colloidal system and polymeric chains giving steric stabilisation, so as to hold the particles apart.

Polymeric dispersants are two-component structures, comprising an anchor group (providing strong adsorption onto the pigment surface by single-point or multi-point anchoring) and one or more polymeric chain(s) (attached to the anchoring group to provide steric stabilization). In some examples, the dispersant may comprise a polymeric dispersant comprising:

1. a polymer chain with a terminal anchor group, or
2. a polymer chain with an anchor group at both ends, or
3. a BAB block co-polymer, or
4. an ABA block co-polymer, or
5. a random co-polymer, or
6. a comb co-polymer;

wherein the anchor group is a group which binds to or is absorbed by the pigment particle.

In some examples, on addition to the pigment before mixing, the polymeric dispersant is in suspension or dissolved in a solvent, in some examples the dispersant com- prises greater than 50 wt % polymeric dispersant, in some examples the dispersant comprises greater than 60 wt % polymeric dispersant, in some examples the dispersant comprises greater than 70 wt % dispersant, in some examples the dispersant comprises greater than 80 wt % polymeric dispersant, in some examples the dispersant comprises greater than 90 wt % polymeric dispersant. The solvent may be an organic solvent, in some examples a deeply hydrogenated solvent, in some examples a solvent which consists essentially of $C_9$-$C_{11}$ paraffins and naphthenes. The dispersant may consist of, or consist essentially of, polymeric dispersant.

In some examples, the polymeric dispersant is a basic polymeric dispersant. In some examples, the polymeric dispersant is a basic dispersant, and comprises a basic anchor group, e.g. an amine group. In some examples, each polymeric dispersant molecule comprises a multi amine anchor group or a single amine anchor group, in some examples each polymeric dispersant molecular comprises a multi amine anchor group.

In some examples, each polymeric dispersant molecule comprises one polymer chain or a plurality of polymer chains. In some examples, each polymeric dispersant molecule comprises one polymer chain having a single anchor group, for example an amine group. In some examples, each polymeric dispersant molecule comprises one polymer chain having a plurality of anchor groups, for example a plurality of amine groups. In some examples, the polymer chain has acidic side groups.

In some examples, the polymeric dispersant comprises a co-polymer. In some examples, the polymeric dispersant comprises a block co-polymer having multiple anchor groups, for example an ABA block co-polymer or a BAB block co-polymer or a random copolymer. In some examples, the polymeric dispersant comprises a comb co-polymer.

In some examples, the dispersant is of formula (I)

formula (I)

wherein $R_a$, $R_b$ and $R_c$ are selected from an amine-containing head group, a hydrocarbon tail group and hydrogen, wherein at least one of $R_a$, $R_b$ and $R_c$ comprises a hydrocarbon tail group, and at least one of $R_a$, $R_b$ and $R_c$ comprises an amine-containing head group. The amine-containing head group may comprise a primary, secondary or tertiary amine. In some examples, $R_a$ and $R_b$ are selected from a hydrocarbon tail group and hydrogen, with at least one of $R_a$ and $R_b$ comprising a hydrocarbon tail group, and $R_c$ comprises an amine-containing head group. The hydrocarbon tail group may comprise or be a hydrocarbon group, which may be branched or straight chain and may be unsubstituted. The hydrocarbon tail group may comprise or be a hydrocarbon group containing a polyalkylene, which may be selected from a polyethylene, polypropylene, polybutylene. In some examples, the hydrocarbon tail group may contain a polyisobutylene. The hydrocarbon tail group may contain from 10 to 100 carbons, in some examples from 10 to 50 carbons, in some examples from 10 to 30 carbons. The hydrocarbon tail group may be of the formula (II)

P-L-                   formula (II), wherein P is or comprises polyisobutylene and L is selected from a single bond, $(CH_2)_n$, wherein n is from 0 to 5, in some examples 1 to 5, —O— and —NH—. In some examples, the amine-containing head group comprises or is a hydrocarbon group having an amine group attached to one of the carbons of the hydrocarbon group. In some examples, the amine-containing head group is of the formula (III)

formula (III), wherein m is at least 1, in some examples 1 to 5, q is 0 to 10, o is 0, 1 or 2, p is 1 or 2, r is 0 to 10; in some examples, m is 1, o is 1, p is 1 and q is from 0 to 10, in some examples from 1 to 5, and in some examples r is 1 to 5; in some examples m is 1, q is 0 to 10, in some examples 1 to 10, in some examples 1 to 5, o is 1, p is 1, r is 1. In some examples, m is at least 1, q is an integer, o is 0, 1 or 2, p is 1 or 2, r is 0 or an integer of 1 or more. In some other examples, m is 1, o is 1, p is 1, q is 1 to 3, and r is 1. Yet in some further examples, g is 1 or 2.

In some examples, the dispersant is of formula (I), wherein $R_a$ is of formula (II), $R_b$ is H and $R_c$ is of formula (III). In some examples, the dispersant is of formula (I), wherein $R_a$ is of formula (II), wherein L is —$CH_2$—, $R_b$ is H and $R_c$ is of formula (III), wherein m is q is 0 to 10, in some examples 1 to 10, in some examples 1 to 5, o is 1, p is 1 and r is 1. In some examples, the dispersant is or comprises polyisobutylene succimide polyethylene amine non ionic dispersant. In some examples, the dispersant is or comprises: LUBRIZOL® 2153.

In some examples, the dispersant is a basic dispersant having a total base number (TBN) of at least 5 mgKOH/gr material, in some examples a TBN of at least 10 mgKOH/gr material, in some examples a TBN of at least 20 mgKOH/gr material, in some examples a TBN of at least 30 mgKOH/gr material, in some examples from 5 mgKOH/gr material to 150 mgKOH/gr material, in some examples from 10 mgKOH/gr material to 500 mgKOH/gr material, in some examples from 20 mgKOH/gr material to 140 mgKOH/gr material, in some examples from 40 mgKOH/gr material to 110 mgKOH/gr material, in some examples from 50 mgKOH/gr material to 100 mgKOH/gr material, in some examples from 60 mgKOH/gr material to 90 mgKOH/gr material, in some examples from 70 mgKOH/gr material to 90 mgKOH/gr material, in some examples about 75 mgKOH/gr material.

Total base number (TBN), sometimes simply referred to as base number, may be determined using standard techniques, including, those laid out in ASTM Designation D4739-08, such as Test Method D2896, Test Method D4739, and ASTM Designation D974-08, with Test Method D2896 being used if any discrepancy is shown between test methods, and unless otherwise stated, the test method(s) will be the most recently published at the time of filing this patent application. "mgKOH/gr material" indicates "mgKOH per gram of dispersant". The measurement of TBN of the dispersant can either be on the pure dispersant, or a dispersant in a hydrocarbon liquid, such 60 wt % dispersant in white spirit, e.g. dearomatized white spirit, and then adjusted as if it had been measured on the pure dispersant.

In some examples, the dispersant, which may comprises a succinimide, which may be as described above, has a molecular weight (MW) of from 500 Daltons to 10,000 Daltons, in some examples a MW of from 1000 to 6,000

Daltons, in some examples a MW of from 1000 to 6,000 Daltons, in some examples a MW of from 1000 to 5000 Daltons, in some examples a MW of from 2000 to 4000 Daltons, in some examples a MW of about 3000 Daltons, or in some examples a MW of from 500 to 3000 Daltons, in some examples a MW of from 700 to 2700 Daltons, in some examples a MW of from 1000 to 2400 Daltons, in some examples a MW of from 1200 to 2200 Daltons, in some examples a MW of from 1500 to 2000 Daltons, in some examples a MW of from 1500 to 1900 Daltons, in some, in some examples a MW of from 1600 to 1800 Daltons in some examples a MW of 1700 Daltons. Daltons may also be expressed as g/mol.

The % AOWP (the percentage agent on the weight of pigment) is the number of grams of dispersant per 100 g of pigment. In some examples, the % AOWP of the dispersion is from 1% to 70%, in some examples from 1% to 60%, in some examples from 5% to 55%, in some examples from 10% to 50%, in some examples from 10% to 40%, in some examples from 10% to 30%, in some examples from 15% to 25%, in some examples about 18% to 22%, in some examples about 20%.

The dispersant may constitute from 0.1 wt % to 12 wt % of the electrostatic ink composition, in some examples 0.5 wt % to 6 wt % the electrostatic ink composition, in some examples 1 wt % to 6 wt % of the electrostatic ink composition, in some examples 2 wt % to 4 wt % of the electrostatic ink composition.

Liquid Carrier

The method may involve using and/or the electrostatic ink composition may further include a liquid carrier. In some examples, the mixing of the pigment and the dispersant is carried out in a liquid carrier (i.e. the pigment and dispersant are mixed in a liquid carrier) and/or the grinding of the dispersion and the resin is carried out in a liquid carrier (i.e. the pigment dispersion and the resin is ground in the presence of a liquid carrier). In some examples, in the electrostatic ink composition formed in the method, particles including the resin, the magenta pigment and the dispersant may be dispersed in the liquid carrier. The liquid carrier can include or be a hydrocarbon, silicone oil, vegetable oil, etc. The liquid carrier can include, but is not limited to, an insulating, non-polar, non-aqueous liquid that can be used as a medium for toner particles, i.e. the chargeable particles including the resin and, in some examples, a pigment. The liquid carrier can include compounds that have a resistivity in excess of about $10^9$ ohm-cm. The liquid carrier may have a dielectric constant below about 5, in some examples below about 3. The liquid carrier can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof. Examples of the liquid carriers include, but are not limited to, aliphatic hydrocarbons, isoparaffinic compounds, paraffinic compounds, dearomatized hydrocarbon compounds, and the like. In particular, the liquid carriers can include, but are not limited to, ISOPAR-G™, ISOPAR-H™, ISOPAR-L™, ISOPAR-M™, ISOPAR-K™, ISOPAR-V™, NORPAR 12™, NORPAR 13™, NORPAR 15™, EXXOL D40™, EXXOL D80™, EXXOL D100™, EXXOL D130™, and EXXOL D140™ (each sold by Exxon Corporation); TECLENT N-16™, TECLEN N-20™, TECLEN N-22™, NISSEKI NAPHTHESOL L™, NISSEKI NAPHTHESOL M™, NISSEKI NAPHTHESOL H™, #0 SOLVENT L™, #0 SOLVENT M™, #0 SOLVENT H™, NISSEKI ISOSOL 300™, NISSEKI ISOSOL 400™, AF-4™, AF-5™, AF-6™ and AF-7™ (each sold by Nippon Oil Corporation); IP SOLVENT 1620™ and IP SOLVENT 2028™ (each sold by Idemitsu Petrochemical Co., Ltd.); AMSCO OMS™ and AMSCO 460™ (each sold by American Mineral Spirits Corp.); and ELECTRON, POSITRON, NEW II, PUROGEN HF (100% synthetic terpenes) (sold by Ecolink).

The liquid carrier can constitute about 20% to 99.5% by weight of the electrostatic ink composition, in some examples 50% to 99.5% by weight of the electrostatic ink composition. The liquid carrier may constitute about 40 to 90% by weight of the electrostatic ink composition. The liquid carrier may constitute about 60% to 80% by weight of the electrostatic ink composition. The liquid carrier may constitute about 90% to 99.5% by weight of the electrostatic ink composition, in some examples 95% to 99% by weight of the electrostatic ink composition.

The electrostatic ink composition, when printed on a print substrate, may be substantially free from liquid carrier. In an electrostatic printing process and/or afterwards, the liquid carrier may be removed, e.g. by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples less than 1 wt % liquid carrier, in some examples less than 0.5 wt % liquid carrier. In some examples, the ink printed on the print substrate is free from liquid carrier.

Resin

The method involves using and/or the electrostatic ink composition includes a resin, which may be a thermoplastic resin. A thermoplastic polymer is sometimes referred to as a thermoplastic resin. The resin may coat a pigment, e.g. a pigment, such that the particles include a core of pigment, and have an outer layer of resin thereon. The outer layer of resin may coat the pigment partially or completely.

The resin includes a polymer. In some examples, the polymer of the resin may be selected from ethylene or propylene acrylic acid co-polymers; ethylene or propylene methacrylic acid co-polymers; co-polymers of ethylene or propylene (e.g. 80 wt % to 99.9 wt %), and alkyl (e.g. C1 to C5) ester of methacrylic or acrylic acid (e.g. 0.1 wt % to 20 wt %); co-polymers of ethylene (e.g. 80 wt % to 99.9 wt %), acrylic or methacrylic acid (e.g. 0.1 wt % to 20.0 wt %) and alkyl (e.g. C1 to C5) ester of methacrylic or acrylic acid (e.g. 0.1 wt % to 20 wt %); acrylic resins (e.g. co-polymer of acrylic or methacrylic acid and at least one alkyl ester of acrylic or methacrylic acid wherein alkyl may have from 1 to about 20 carbon atoms, such as methyl methacrylate (e.g. 50% to 90%)/methacrylic acid (e.g. 0 wt % to 20 wt %)/ethylhexylacrylate (e.g. 10 wt % to 50 wt %)); ethylene-acrylic acid ionomers and combinations thereof. The resin may further include other polymers, including, but not limited to, ethylene vinyl acetate co-polymers; co-polymers of ethylene or propylene (e.g. 70 wt % to 99.9 wt %) and maleic anhydride (e.g. 0.1 wt % to 30 wt %); polyethylene; polystyrene; isotactic polypropylene (crystalline); co-polymers of ethylene ethylene ethyl acrylate; polyesters; polyvinyl toluene; polyamides; styrene/butadiene co-polymers; epoxy resins; ethylene-acrylate terpolymers: ethylene-acrylic esters-maleic anhydride (MAH) or glycidyl methacrylate (GMA) terpolymers The resin may include a polymer having acidic side groups. Examples of the polymer having acidic side groups will now be described. The polymer having acidic side groups may have an acidity of 50 mg KOH/g or more, in some examples an acidity of 60 mg KOH/g or more, in some examples an acidity of 70 mg KOH/g or more, in some examples an acidity of 80 mg KOH/g or more, in some examples an acidity of 90 mg KOH/g or more, in some examples an acidity of 100 mg KOH/g or more, in some examples an acidity of 105 mg KOH/g or more, in some examples 110 mg KOH/g or more, in some examples 115 mg KOH/g or more. The polymer having acidic side groups may have an acidity of 200 mg KOH/g or less, in some examples 190 mg or less, in some examples 180 mg or less, in some examples 130 mg KOH/g or less, in some examples 120 mg KOH/g or less. Acidity of a polymer, as measured in mg KOH/g can be measured using standard procedures known in the art, for example using the procedure described in ASTM D1386.

The resin may include a polymer, in some examples a polymer having acidic side groups, that has a melt flow rate of less than about 70 g/10 minutes, in some examples about 60 g/10 minutes or less, in some examples about 50 g/10 minutes or less, in some examples about 40 g/10 minutes or less, in some examples 30 g/10 minutes or less, in some examples 20 g/10 minutes or less, in some examples 10 g/10 minutes or less. In some examples, all polymers having acidic side groups and/or ester groups in the particles each individually have a melt flow rate of less than 90 g/10 minutes, 80 g/10 minutes or less, in some examples 80 g/10 minutes or less, in some examples 70 g/10 minutes or less, in some examples 70 g/10 minutes or less, in some examples 60 g/10 minutes or less.

The polymer having acidic side groups can have a melt flow rate of about 10 g/10 minutes to about 120 g/10 minutes, in some examples about 10 g/10 minutes to about 70 g/10 minutes, in some examples about 10 g/10 minutes to 40 g/10 minutes, in some examples 20 g/10 minutes to 30 g/10 minutes. The polymer having acidic side groups can have a melt flow rate of, in some examples, about 50 g/10 minutes to about 120 g/10 minutes, in some examples 60 g/10 minutes to about 100 g/10 minutes. The melt flow rate can be measured using standard procedures known in the art, for example as described in ASTM D1238.

The acidic side groups may be in free acid form or may be in the form of an anion and associated with one or more counterions, typically metal counterions, e.g. a metal selected from the alkali metals, such as lithium, sodium and potassium, alkali earth metals, such as magnesium or calcium, and transition metals, such as zinc. The polymer having acidic sides groups can be selected from resins such as co-polymers of ethylene and an ethylenically unsaturated acid of either acrylic acid or methacrylic acid; and ionomers thereof, such as methacrylic acid and ethylene-acrylic or methacrylic acid co-polymers which are at least partially neutralized with metal ions (e.g. Zn, Na, Li) such as SURLYN® ionomers. The polymer including acidic side groups can be a co-polymer of ethylene and an ethylenically unsaturated acid of either acrylic or methacrylic acid, where the ethylenically unsaturated acid of either acrylic or methacrylic acid constitute from 5 wt % to about 25 wt % of the co-polymer, in some examples from 10 wt % to about 20 wt % of the co-polymer.

The resin may include two different polymers having acidic side groups. The two polymers having acidic side groups may have different acidities, which may fall within the ranges mentioned above. The resin may include a first polymer having acidic side groups that has an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has an acidity of 110 mg KOH/g to 130 mg KOH/g.

The resin may include two different polymers having acidic side groups: a first polymer having acidic side groups that has a melt flow rate of about 10 g/10 minutes to about 50 g/10 minutes and an acidity of from 10 mg KOH/g to 110 mg KOH/g, in some examples 20 mg KOH/g to 110 mg KOH/g, in some examples 30 mg KOH/g to 110 mg KOH/g, in some examples 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The ratio of the first polymer having acidic side groups to the second polymer having acidic side groups can be from about 10:1 to about 2:1. The ratio can be from about 6:1 to about 3:1, in some examples about 4:1.

The resin may include a polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; said polymer may be a polymer having acidic side groups as described herein. The resin may include a first polymer having a melt viscosity of 15000 poise or more, in some examples 20000 poise or more, in some examples 50000 poise or more, in some examples 70000 poise or more; and in some examples, the resin may include a second polymer having a melt viscosity less than the first polymer, in some examples a melt viscosity of 15000 poise or less, in some examples a melt viscosity of 10000 poise or less, in some examples 1000 poise or less, in some examples 100 poise or less, in some examples 50 poise or less, in some examples 10 poise or less. The resin may include a first polymer having a melt viscosity of more than 60000 poise, in some examples from 60000 poise to 100000 poise, in some examples from 65000 poise to 85000 poise; a second polymer having a melt viscosity of from 15000 poise to 40000 poise, in some examples 20000 poise to 30000 poise, and a third polymer having a melt viscosity of 15000 poise or less, in some examples a melt viscosity of 10000 poise or less, in some examples 1000 poise or less, in some examples 100 poise or less, in some examples 50 poise or less, in some examples 10 poise or less; an example of the first polymer is NUCREL 960 (from DuPont), an example of the second polymer is NUCREL 699 (from DuPont), and an example of the third polymer is AC-5120 or AC-5180 (from Honeywell). The first, second and third polymers may be polymers having acidic side groups as described herein. The melt viscosity can be measured using a rheometer, e.g. a commercially available AR-2000 rheometer from Thermal Analysis Instruments, using the geometry of: 25 mm steel plate-standard steel parallel plate, and finding the plate over plate rheometry isotherm at 120° C., 0.01 hz shear rate.

If the resin in electrostatic ink or ink composition includes a single type of polymer, the polymer (excluding any other components of the electrostatic ink composition) may have a melt viscosity of 6000 poise or more, in some examples a melt viscosity of 8000 poise or more, in some examples a melt viscosity of 10000 poise or more, in some examples a melt viscosity of 12000 poise or more. If the resin includes a plurality of polymers all the polymers of the resin may together form a mixture (excluding any other components of the electrostatic ink composition) that has a melt viscosity of 6000 poise or more, in some examples a melt viscosity of 8000 poise or more, in some examples a melt viscosity of 10000 poise or more, in some examples a melt viscosity of 12000 poise or more. Melt viscosity can be measured using standard techniques. The melt viscosity can be measured using a rheometer, e.g. a commercially available AR-2000 Rheometer from Thermal Analysis Instruments, using the geometry of: 25 mm steel plate-standard steel parallel plate, and finding the plate over plate rheometry isotherm at 120° C., 0.01 hz shear rate.

The resin may include two different polymers having acidic side groups that are selected from co-polymers of ethylene and an ethylenically unsaturated acid of either acrylic acid or methacrylic acid; or ionomers thereof, such as methacrylic acid and ethylene-acrylic or methacrylic acid co-polymers which are at least partially neutralized with metal ions (e.g. Zn, Na, Li) such as SURLYN® ionomers. The resin may include (i) a first polymer that is a co-polymer of ethylene and an ethylenically unsaturated acid of either acrylic acid and methacrylic acid, wherein the ethylenically unsaturated acid of either acrylic or methacrylic acid constitutes from 8 wt % to about 16 wt % of the co-polymer, in some examples 10 wt % to 16 wt % of the co-polymer; and (ii) a second polymer that is a co-polymer of ethylene and an ethylenically unsaturated acid of either acrylic acid and methacrylic acid, wherein the ethylenically unsaturated acid of either acrylic or methacrylic acid constitutes from 12 wt % to about 30 wt % of the co-polymer, in some examples from 14 wt % to about 20 wt % of the co-polymer, in some examples from 16 wt % to about 20 wt % of the co-polymer in some examples from 17 wt % to 19 wt % of the co-polymer.

The resin may include a polymer having acidic side groups, as described above (which may be free of ester side groups), and a polymer having ester side groups. The polymer having ester side groups may be a thermoplastic polymer. The polymer having ester side groups may further include acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbons, in some examples 1 to 20 carbons, in some examples 1 to 10 carbons; in some examples selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1% to 50% by weight of the co-polymer, in some examples 5% to 40% by weight, in some examples 5% to 20% by weight of the co-polymer, in some examples 5% to 15% by weight of the co-polymer. The second monomer may constitute 1% to 50% by weight of the co-polymer, in some examples 5% to 40% by weight of the co-polymer, in some examples 5% to 20% by weight of the co-polymer, in some examples 5% to 15% by weight of the co-polymer. The first monomer can constitute 5% to 40% by weight of the co-polymer, the second monomer constitutes 5% to 40% by weight of the co-polymer, and with the third monomer constituting the remaining weight of the co-polymer. In some examples, the first monomer constitutes 5% to 15% by weight of the co-polymer, the second monomer constitutes 5% to 15% by weight of the co-polymer, with the third monomer constituting the remaining weight of the co-polymer. In some examples, the first monomer constitutes 8% to 12% by weight of the co-polymer, the second monomer constitutes 8% to 12% by weight of the co-polymer, with the third monomer constituting the remaining weight of the co-polymer. In some examples, the first monomer constitutes about 10% by weight of the co-polymer, the second monomer constitutes about 10% by weight of the co-polymer, and with the third monomer constituting the remaining weight of the co-polymer. The polymer may be selected from the BYNEL® class of monomer, including BYNEL® 2022 and BYNEL® 2002, which are available from DuPont.

The polymer having ester side groups may constitute 1% or more by weight of the total amount of the resin polymers, e.g. thermoplastic resin polymers, in the electrostatic ink composition and/or the ink printed on the print substrate, e.g. the total amount of the polymer or polymers having acidic side groups and polymer having ester side groups. The polymer having ester side groups may constitute 5% or more by weight of the total amount of the resin polymers, e.g. thermoplastic resin polymers, in some examples 8% or more by weight of the total amount of the resin polymers, e.g. thermoplastic resin polymers, in some examples 10% or more by weight of the total amount of the resin polymers, e.g. thermoplastic resin polymers, in some examples 15% or more by weight of the total amount of the resin polymers, e.g. thermoplastic resin polymers, in some examples 20% or more by weight of the total amount of the resin polymers, e.g. thermoplastic resin polymers, in some examples 25% or more by weight of the total amount of the resin polymers, e.g. thermoplastic resin polymers, in some examples 30% or more by weight of the total amount of the resin polymers, e.g. thermoplastic resin polymers, in some examples 35% or more by weight of the total amount of the resin polymers, e.g. thermoplastic resin polymers, in the electrostatic ink composition and/or the ink printed on the print substrate. The polymer having ester side groups may constitute from 5% to 50% by weight of the total amount of the resin polymers, e.g. thermoplastic resin polymers, in the electrostatic ink composition and/or the ink printed on the print substrate, in some examples 10% to 40% by weight of the total amount of the resin polymers, e.g. thermoplastic resin polymers, in the electrostatic ink composition and/or the ink printed on the print substrate, in some examples 5% to 30% by weight of the total amount of the resin polymers, e.g. thermoplastic resin polymers, in the electrostatic ink composition and/or the ink printed on the print substrate, in some examples 5% to 15% by weight of the total amount of the resin polymers, e.g. thermoplastic resin polymers, in the electrostatic ink composition and/or the ink printed on the print substrate in some examples 15% to 30% by weight of the total amount of the resin polymers, e.g. thermoplastic resin polymers, in the electrostatic ink composition and/or the ink printed on the print substrate.

The polymer having ester side groups may have an acidity of 50 mg KOH/g or more, in some examples an acidity of 60 mg KOH/g or more, in some examples an acidity of 70 mg KOH/g or more, in some examples an acidity of 80 mg KOH/g or more. The polymer having ester side groups may have an acidity of 100 mg KOH/g or less, in some examples 90 mg KOH/g or less. The polymer having ester side groups may have an acidity of 60 mg KOH/g to 90 mg KOH/g, in some examples 70 mg KOH/g to 80 mg KOH/g.

The polymer having ester side groups may have a melt flow rate of about 10 g/10 minutes to about 120 g/10 minutes, in some examples about 10 g/10 minutes to about 50 g/10 minutes, in some examples about 20 g/10 minutes to about 40 g/10 minutes, in some examples about 25 g/10 minutes to about 35 g/10 minutes.

The polymer, polymers, co-polymer or co-polymers of the resin can in some examples be selected from the NUCREL® family of toners (e.g. NUCREL 403™, NUCREL 407™, NUCREL 609HS™, NUCREL 908HS™, NUCREL 1202HC™, NUCREL 30707™, NUCREL 1214™, NUCREL 903™, NUCREL 3990™, NUCREL 910™, NUCREL 925™, NUCREL 699™, NUCREL 599™, NUCREL 960™, NUCREL RX 76™, NUCREL 2806™, BYNELL 2002, BYNELL 2014, and BYNELL 2020 (sold by E. I. du PONT)), the ACLYN family of toners (e.g. ACLYN 201, ACLYN 246, ACLYN 285, and ACLYN 295), and the LOTADER family of toners (e.g. LOTADER 2210, LOTADER, 3430, and LOTADER 8200 (sold by Arkema).

In some examples, the pigment constitutes a certain wt %, e.g. from 1 wt %, to 30 wt % of the solids of the electrostatic ink composition, and the remaining wt % of the solids of the electrostatic ink composition is formed by the resin and, in some examples, any other additives that are present. The other additives may constitute 10 wt % or less of the solids of the electrostatic ink composition, in some examples 5 wt % or less of the solids of the electrostatic ink composition, in some examples 3 wt % or less of the solids of the electrostatic ink composition. In some examples, the resin may constitute 5% to 99% by weight of the solids in the electrostatic ink composition, in some examples 50% to 90% by weight of the solids of the electrostatic ink composition, in some examples 70% to 90% by weight of the solids of the electrostatic ink composition. The remaining wt % of the solids in the ink composition may be a pigment and, in some examples, any other additives that may be present.

Charge Director and Charge Adjuvant

The method involves using and/or the electrostatic ink composition includes a charge director. The charge director may be added in order to impart and/or maintain sufficient electrostatic charge on the ink particles, which may be particles comprising the pigment, the resin and the dispersant. In some examples, the charge director may be selected from ionic compounds, such as metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, etc. In some examples, the charge director is selected from, but is not limited to, oil-soluble petroleum sulfonates (e.g. neutral Calcium PETRONATE™, neutral Barium PETRONATE™, and basic Barium PETRONATE™), polybutylene succinimides (e.g. OLOA™ 1200 and AMOCO 575), and glyceride salts (e.g. sodium salts of phosphated mono- and diglycerides with unsaturated and saturated acid substituents), sulfonic acid salts including, but not limited to, barium, sodium, calcium, and aluminum salts of a sulfonic acid. The sulfonic acids may include, but are not limited to, alkyl sulfonic acids, aryl sulfonic acids, and sulfonic acids of alkyl succinates (e.g. see WO 2007/130069). In some examples, the charge director imparts a negative charge on the particles of the ink composition. In some examples, the charge director imparts a positive charge on the particles of the ink composition. In some examples, the charge director comprises a phospholipid, in some examples a salt or an alcohol of a phospholipid. In some examples, the charge director comprises species selected from a phosphatidylcholine and derivatives thereof.

In some examples, the charge director includes a sulfosuccinate moiety of the general formula $[R_1\text{—O—C(O)CH}_2\text{CH(SO}_3^-)\text{C(O)—O—R}_2]$, where each of $R_1$ and $R_2$ is an alkyl group. In some examples, the charge director includes nanoparticles of a simple salt and a sulfosuccinate salt of the general formula MAn, wherein M is a metal, n is the valence of M, and A is an ion of the general formula $[R_1\text{—O—C(O)CH}_2\text{CH(SO}_3^-)\text{C(O)—O—R}_2]$, where each of $R_1$ and $R_2$ is an alkyl group, or other charge directors as found in WO2007130069, which is incorporation herein by reference in its entirety. As described in WO2007130069, the sulfosuccinate salt of the general formula MAn is an example of a micelle forming salt. The charge director may be substantially free or free of an acid of the general formula HA, where A is as described above. The charge director may include micelles of said sulfosuccinate salt enclosing at least some of the nanoparticles. The charge director may include at least some nanoparticles having a size of 200 nm or less, and/or in some examples 2 nm or more. As described in WO2007130069, simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, NH4, tert-butyl ammonium, Li+, and Al+3, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), $Cl^-$, $BF_4^-$, $F—$, $ClO_4—$, and $TiO_3^{4+}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, Tert-butyl ammonium bromide, $NH_4NO_3$, $LiTFA$, $Al_2(SO_4)_3$, $LiClO_4$ and $LiBF_4$, or any sub-group thereof. The charge director may further include basic barium petronate (BBP).

In the formula $[R_1\text{—O—C(O)CH}_2\text{CH(SO}_3^-)\text{C(O)—O—R}_2]$, in some examples each of $R_1$ and $R_2$ is an aliphatic alkyl group. In some examples, each of $R_1$ and $R_2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R_1$ and $R_2$ are the same. In some examples, at least one of $R_1$ and $R_2$ is C13H27. In some examples, M is Na, K, Cs, Ca, or Ba. The formula $[R_1\text{—O—C(O)CH}_2\text{CH(SO}_3)\text{C(O)—O—R}_2]$ and/or the formula MAn may be as defined in any part of WO2007130069.

The charge director may include one of, some of or all of (i) soya lecithin, (ii) a barium sulfonate salt, such as basic barium petronate (BPP), and (iii) an isopropyl amine sulfonate salt. Basic barium petronate is a barium sulfonate salt of a 21-26 hydrocarbon alkyl, and can be obtained, for example, from Chemtura. An example isopropyl amine sulphonate salt is dodecyl benzene sulfonic acid isopropyl amine, which is available from Croda.

In some examples, the charge director constitutes about 0.001% to 20%, in some examples 0.01% to 20% by weight, in some examples 0.01 to 10% by weight, in some examples 0.01% to 1% by weight of the solids of an electrostatic ink composition. In some examples, the charge director constitutes about 0.001% to 0.15% by weight of the solids of the electrostatic ink composition, in some examples 0.001% to 0.15%, in some examples 0.001% to 0.02% by weight of the solids of an electrostatic ink composition, in some examples 0.1% to 2% by weight of the solids of the electrostatic ink composition, in some examples 0.2% to 1.5% by weight of the solids of the electrostatic ink composition in some examples 0.1% to 1% by weight of the solids of the electrostatic ink composition, in some examples 0.2% to 0.8% by weight of the solids of the electrostatic ink composition. In some examples, the charge director is present in an amount of at least 1 mg of charge director per gram of solids of the electrostatic ink composition (which will be abbreviated to mg/g), in some examples at least 2 mg/g, in some examples at least 3 mg/g, in some examples at least 4 mg/g, in some examples at least 5 mg/g. In some examples, the moderate acid is present in the amounts stated above, and the charge director is present in an amount of from 1 mg to 50 mg of charge director per gram of solids of the electrostatic ink composition (which will be abbreviated to mg/g), in some examples from 1 mg/g to 50 mg/g, in some examples from 1 mg/g to 40 mg/g, in some examples from 5 mg/g to 40 mg/g, in some examples from 10 mg/g to 30 mg/g, in some examples from 15 mg/g to 30 mg/g, in some examples from 20 mg/g to 30 mg/g, in some examples from 20 mg/g to 25 mg/g.

The electrostatic ink composition may include a charge adjuvant. A charge adjuvant may promote charging of the particles when a charge director is present. The method as described here may involve adding a charge adjuvant at any stage. In some example, the charge adjuvant may be added during the mixing of the magenta pigment basic dispersant to form the pigment dispersion. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminum di- or tristearate. The charge adjuvant may be present in an amount of about 0.1 to 5% by weight, in some examples about 0.1 to 1% by weight, in some examples about 0.3 to 0.8% by weight of the solids of the electrostatic ink composition, in some examples about 1 wt % to 3 wt % of the solids of the electrostatic ink composition, in some examples about 1.5 wt % to 2.5 wt % of the solids of the electrostatic ink composition.

In some examples, the electrostatic ink composition further includes, e.g. as a charge adjuvant, a salt of multivalent cation and a fatty acid anion. The salt of multivalent cation and a fatty acid anion can act as a charge adjuvant. The multivalent cation may, in some examples, be a divalent or a trivalent cation. In some examples, the multivalent cation is selected from Group 2, transition metals and Group 3 and Group 4 in the Periodic Table. In some examples, the multivalent cation includes a metal selected from Ca, Sc, Ti, V, Cr, Mn, Fe, Co, Ni, Cu, Zn, and Al. In some examples, the multivalent cation is Al3+. The fatty acid anion may be selected from a saturated or unsaturated fatty acid anion. The fatty acid anion may be selected from a $C_8$ to $C_{26}$ fatty acid anion, in some examples a $C_{14}$ to $C_{22}$ fatty acid anion, in some examples a $C_{16}$ to $C_{20}$ fatty acid anion, in some examples a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of multivalent cation and a fatty acid anion, may be present in an amount of 0.1 wt % to 5 wt % of the solids of the electrostatic ink composition, in some examples in an amount of 0.1 wt % to 2 wt % of the solids of the electrostatic ink composition, in some examples in an amount of 0.1 wt % to 2 wt % of the solids of the electrostatic ink composition, in some examples in an amount of 0.3 wt % to 1.5 wt % of the solids of the electrostatic ink composition, in some examples about 0.5 wt % to 1.2 wt % of the solids of the electrostatic ink composition, in some examples about 0.8 wt % to 1 wt % of the solids of the electrostatic ink composition, in some examples about 1 wt % to 3 wt % of the solids of the electrostatic ink composition, in some examples about 1.5 wt % to 2.5 wt % of the solids of the electrostatic ink composition.

Other Additives

The electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the resin. Specifically, the wax phase separates from the resin phase upon the cooling of the resin fused mixture on a print substrate during and after the transfer of the ink film to the print substrate, e.g. from an intermediate transfer member, which may be a heated blanket.

Printing Process and Print Substrate

Also provided is a method of electrostatic printing, the method including:
  producing or providing an electrostatic ink composition as described herein,
  contacting the electrostatic ink composition with a latent electrostatic image on a surface to create a developed image,
  transferring the developed image to a print substrate, in some examples via an intermediate transfer member.

In some examples, the surface on which the (latent) electrostatic image is formed or developed may be on a rotating member, e.g. in the form of a cylinder. The surface on which the (latent) electrostatic image is formed or developed may form part of a photo imaging plate (PIP). The method may involve passing the electrostatic ink composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, e.g. to a temperature of from 80 to 160° C.

The present disclosure also provides an electrostatic ink composition producible according to the method described herein. There may also be provided a print substrate having printed thereon an electrostatic ink composition producible according to the method described herein.

The print substrate may be any suitable substrate. The substrate may be any suitable substrate capable of having an image printed thereon. The substrate may include a material selected from an organic or inorganic material. The material may include a natural polymeric material, e.g. cellulose. The material may include a synthetic polymeric material, e.g. a polymer formed from alkylene monomers, including, but not limited to, polyethylene and polypropylene, and co-polymers such as styrene-polybutadiene. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), mixtures thereof. In an example, the substrate includes a cellulosic paper. In an example, the cellulosic paper is coated with a polymeric material, e.g. a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic print substrate such as paper. The cellulosic print substrate is, in some examples, a coated cellulosic print. In some examples, a primer may be coated onto the print substrate, before the electrostatic ink composition is printed onto the print substrate.

EXAMPLES

The following illustrates examples of the compositions, methods and other aspects described herein. Thus, these Examples should not be considered as limitations of the present disclosure, but are merely in place to teach how to make examples of the present disclosure.

In the following examples, 'ISOPAR' is ISOPAR™ L Fluid, produced by ExxonMobil and having CAS Number 64742-48-9.

In the following examples, the magenta primary pigment is Permanent Carmine FBB 02, available from Clariant. The secondary magenta pigment is QUINDO® Magenta 122 (available from Sun Chemical).

In the following examples, the resin used is NUCREL 699, available from DuPont, and A-C 5120, available from Honeywell, in a weight ratio of 4:1.

In the following examples, the additives used are VCA, DS72 and HPB. VCA indicates an aluminium tristearate and palmitate salt, available from Sigma-Aldrich. HPB indicates a homopolymer polyethylene wax, available under the trade name ACUMIST B6 from Honeywell company. DS72 is a silica powder, available under the trade name AEROSIL® R 7200 from Degussa-Evonik.

In the following examples, SCD is synthetic charge director, being a barium bis sulfosuccinate salt as described in US 2009/0311614 or WO2007130069.

In the following examples, the dispersants shown in Table 1 are used and referred to, where % AOWP is the percentage agent on the weight of pigment.

TABLE 1

| Example No. | Type | % AOWP |
|---|---|---|
| 2* | SOLSPERSE ® 13300 | 20 |
| 3* | SOLSPERSE ® 11200 | |
| 4* | SOLSPERSE ® J560 | |
| 5* | SOLPLUS ® K500 | |
| 6* | SOLSPERSE ® SP16000 | |
| 7* | SOLSPERSE ® SP9000 | |
| 8* | SOLSPERSE ® SP18000 | |
| 10* | OS13309AR | 20 |
| | | 50 |
| 11* | SOLPLUS ® R6000 | 20 |
| 12* | SOLSPERSE ® SP3000 | |
| 13 | LUBRIZOL ® 2153 | |
| 14* | SOLPLUS ® P4000 | |
| 15* | SOLSPERSE ® 21000 | |

*Comparative Examples.

All dispersants were obtained from Lubrizol.

Comparative Example 1

A magenta reference electrostatic ink composition was prepared using a lab grinding tool called attritor, by blending 10-20 wt % Magenta pigments, 65-75 wt % resin, VCA 1-5 wt %, HPB 1-5 wt % 10-15 wt % of Iso Par-L. No dispersant was used to create this ink composition. Toward the end of the process, a charge director (SCD, as indicated above) was added in amounts of from 10 mg SCD/g solids of the ink formulation to 40 mg SCD/g solids of the ink formulation.

Comparative Examples 2-15 and Example 13

In these Examples, a two-stage grinding process was used. In the first stage, the magenta main pigment was ground with liquid dispersant in ISOPAR at different % AOWP (agent on the weight of pigment) in agitated small media mill (EIGER®, 0.6 mm). The rotation of the agitator of the EIGER® and subsequent movement of the media (0.6 mm ceramic beads) creates shear and impact forces for efficient particle and agglomerate size reduction. The formulation for the first stage contains, by weight: ISOPAR—76-88 wt % (in some examples 78 wt %), primary magenta pigment (Permanent Carmine FBB)—10-20 wt % (in some examples 18 wt %), Dispersant—2-4 wt % (in some examples 4 wt %).

In the second stage of the grinding process, in a separate bead mill, an ink was then prepared from the pigment dispersion above (this dispersion being present in an amount of 10-20 wt), 60-70 wt % resin, VCA 1-5 wt %, HPB 1-5 wt % 10-15 wt % of ISOPAR-L. The secondary magenta pigment (QUINDO Magenta 122) was also added in a wt:wt approximate ratio with the primary pigment of 1:7 (the primary pigment being present in the higher amount). *the pigment dispersion inks were prepared in the same manner of the reference.

*the total pigment loading of pigment dispersion inks is the same as in the reference (the amount of pigments in all tested inks is the same).

Toward the end of the process, a charge director (SCD, as indicated above) was added in amounts of from 10 mg SCD/g solids of the ink formulation to 40 mg SCD/g solids of the ink formulation.

Results

Of the dispersants tested, 13300, K500, P6000 and 2153 were most effective in showing an improvement in colour development. Colour development is tested by a 'plating' procedure in which a working dispersion at 2% solids is prepared and charged by a drop of charge director. Then, a Q/M cell is filled with that charged ink dispersion and apply an electric filed similar to what is applied in press. The charged ink particles are developed electrophoretically on top of a coated paper put on the cell. The paper is then heated on a plate to let the oil to evaporate and get a solid smooth ink layer that can be checked for colour by a suitable device.

LUBRIZOL 2153 was found to provide an averaged increase of 14% DMA, and did not display any (or very few) side-effects during printing, compared to 13300, K500 and P6000, such as affecting the charging of the ink, showing background image, or increasing its tackiness, which can lead to printing difficulties. Additionally, dispersant 2153 showed stable charging, both at low field, high field and in direct current tests.

A test was carried out to measure optical density vs % developed mass per area (DMA). This test was conducted on press and its aim is to directly check the amount of ink saved in printing. Thus, the procedure involves a use of a coated paper with high release qualities, namely PRODUCTOLITH PTS. DIGITAL®, available from New Page. The procedure involves setting several optical density (OD) points by a colour adjust procedure. In each OD point 16 separations are printed on the coated paper. When it goes out of press a certain form of that sample is molded with a known area and it is put in the oven for several hours. The molded sample is then weighed, in order to determine the amount of ink, mass, per the area of the molded sample. This is the DMA, defined mass per area. The DMA results are then plotted for several OD points so a trendline is made and compared to the trend line of the reference Magenta. In the tests carried out, in graphs plotted for each DMA (x-axis), the OD (y-axis) of LUBRIZOL 2153 was above the reference ink—results for the reference (Example 1) and 13300 (Example 2), K500 (Example 5), P6000 (Example 11) and 2153 (Example 13) are shown in the FIGURE.

A BOP, Background On Paper, test was conducted on press and its aim was to measure the level optical density in background areas. In this test a job of zero coverage is printed, no ink is transferred to paper, so only background pass to paper. 16 separations were printed and the optical density measured. There is criteria of 0.2 OD for 16 separations of a Magenta colour and we check if we stand in this criteria. The background optical density for the ink containing 2153 was found to be higher than the reference, but still within acceptable limits.

While the method, the electrostatic ink composition and related aspects have been described with reference to certain examples, those skilled in the art will appreciate that various modifications, changes, omissions, and substitutions can be made without departing from the spirit of the disclosure. It is intended, therefore, that the method, compositions and related aspects be limited by the scope of the following claims. The features of any dependent claim can be combined with the features of any of the other dependent claims, and any independent claim.

The invention claimed is:

1. A method of producing a magenta liquid electrostatic ink composition, the method comprising:
    grinding, in a ball mill, a mixture consisting of a magenta pigment, a basic dispersant and a liquid carrier with balls to form a pigment dispersion, wherein the basic dispersant comprises a compound comprising a succinimide group linked to a primary, secondary or tertiary amine; and then
    adding a resin comprising a polymer having acidic side groups to the pigment dispersion, and grinding the pigment dispersion with the resin; and
    combining a charge director with the pigment and the dispersant before, during or after the grinding of the pigment dispersion with the resin, to form the electrostatic ink composition.

2. The method according to claim 1, wherein the dispersant is of formula (I)

formula (I)

wherein $R_a$, $R_b$ and $R_c$ are selected from the group consisting of an amine-containing head group, a hydrocarbon tail group, and hydrogen,
   wherein at least one of $R_a$, $R_b$ and $R_c$ comprises a hydrocarbon tail group,
   and wherein at least one of $R_a$, $R_b$ and $R_c$ comprises an amine-containing head group.

3. The method according to claim 2, wherein the amine-containing head group is of the formula (IV)

$$(CH_2)_m[(CH_2)_oNH(CH_2)_p]_q(CH_2)_r\text{—}NH_2 \qquad \text{formula (IV)},$$

wherein m is at least 1, q is an integer, o is 0, 1 or 2, p is 1 or 2, r is 0 or an integer of 1 or more.

4. The method according to claim 3, wherein m is 1, o is 1, p is 1, q is 1 to 3, and r is 1.

5. The method according to claim 4, wherein q is 1 or 2.

6. The method according to claim 2, wherein the hydrocarbon tail group contains a polyisobutylene.

7. The method according to claim 2, wherein the hydrocarbon tail group may be of the formula (II)

$$\text{P-L-} \qquad \text{formula (II)},$$

wherein P is or comprises polyisobutylene and L is selected from the group consisting of a single bond, $(CH_2)_n$, wherein n is from 0 to 5, —O—, and —NH—.

8. The method according to claim 2, wherein the dispersant has a total base number of from 50 mgKOH/gram material to 150 mgKOH/gram material.

9. The method according to claim 1, wherein the dispersant has a total base number of from 10 mgKOH/gram material to 500 mgKOH/gram material.

10. The method according to claim 1, wherein the dispersant has a total base number of from 50 mgKOH/gram material to 150 mgKOH/gram material.

11. The method according to claim 1, wherein the pigment is selected from the group consisting of Pigment Red 2, Pigment Red 3, Pigment Red 5, Pigment Red 7, Pigment Red 8, Pigment Red 9, Pigment Red 17, Pigment Red 22, Pigment Red 112, Pigment Red 150, Pigment Red 23, Pigment Red 146, Pigment Red 170, Pigment Violet 13, Pigment Violet 25, and Pigment Violet 44.

12. The method according to claim 1, wherein the balls are metal balls or ceramic balls.

13. The method according to claim 1, wherein the balls have a diameter of 0.1 mm to 3 mm.

14. The method according to claim 1, wherein the ball mill rotates at an rpm of 100 rpm to 6000 rpm.

15. The method according to claim 1, wherein the charge director includes a sulfosuccinate moiety of the general formula $[R_{1'}—O—C(O)CH_2CH(SO_3^-)C(O)—O—R_{2'}]$, where each of $R_1{'}$ and $R_2{'}$ is an alkyl group.

* * * * *